United States Patent [19]

Schraut et al.

[11] Patent Number: 4,751,990
[45] Date of Patent: Jun. 21, 1988

[54] MULTI-DISC CLUTCH UNIT, PARTICULARLY FOR HEAVY-DUTY MOTOR VEHICLES

[75] Inventors: Alfred Schraut, Waigolshausen; Peter Janda; Nikolaus-Dieter Mackert, both of Sennfeld; Dieter Howorka, Waigolshausen; Werner Fricke, Hassfurt; Winfried Stürmer, Euerbach; Horst Schwarz, Theres, all of Fed. Rep. of Germany

[73] Assignee: Fichtel & Sachs AG, Schweinfurt, Fed. Rep. of Germany

[21] Appl. No.: 879,277

[22] Filed: Jun. 27, 1986

[30] Foreign Application Priority Data

Jul. 17, 1985 [DE] Fed. Rep. of Germany ....... 3525486

[51] Int. Cl.⁴ ............................................. F16D 21/06
[52] U.S. Cl. ................................... 19/70.27; 192/89 B
[58] Field of Search ................ 192/89 B, 70.27, 70.28, 192/70.23

[56] References Cited

U.S. PATENT DOCUMENTS

| | | | |
|---|---|---|---|
| 2,700,444 | 1/1955 | Ahlen | 192/89 B X |
| 2,751,055 | 6/1956 | Dodge et al. | 192/89 B X |
| 3,779,353 | 12/1973 | Maucher | 192/89 B X |
| 4,210,232 | 7/1980 | Beccaris | 192/89 B X |
| 4,410,074 | 10/1983 | Maucher et al. | 192/70.27 X |
| 4,431,097 | 2/1984 | Scheer | 192/70.28 X |

FOREIGN PATENT DOCUMENTS

| | | |
|---|---|---|
| 0126188 | 11/1984 | European Pat. Off. |
| 3041342 | 6/1982 | Fed. Rep. of Germany |
| 1456149 | 11/1976 | United Kingdom |
| 2051261 | 1/1981 | United Kingdom |
| 2055997 | 3/1981 | United Kingdom |
| 2087002 | 5/1982 | United Kingdom |
| 2149463 | 6/1985 | United Kingdom |

Primary Examiner—Carl D. Friedman
Attorney, Agent, or Firm—Toren, McGeady & Associates

[57] ABSTRACT

A multi-disc clutch comprises a pressure plate, an intermediate plate and two clutch discs on both sides of the intermediate plate. A main spring urges the pressure plate towards a fly-wheel so that the clutch discs are in frictional engagement with the pressure plate, the intermediate plate and the fly-wheel. When the clutch disc is disengaged the pressure plate and the intermediate plate are lifted away from the fly-wheel. The lifting movement of the intermediate plate is effected by a release spring and is controlled by supporting the intermediate plate on a counter support which counter support is axially movable in response to the action of a clutch disengaging member. The counter support is established by a member which has an additional essential function within the clutch. For example, the counter support is established by the main spring or by a leaf spring connecting the pressure plate for common rotation with the clutch cover.

23 Claims, 6 Drawing Sheets

Schnitt A-B

Schnitt C-D

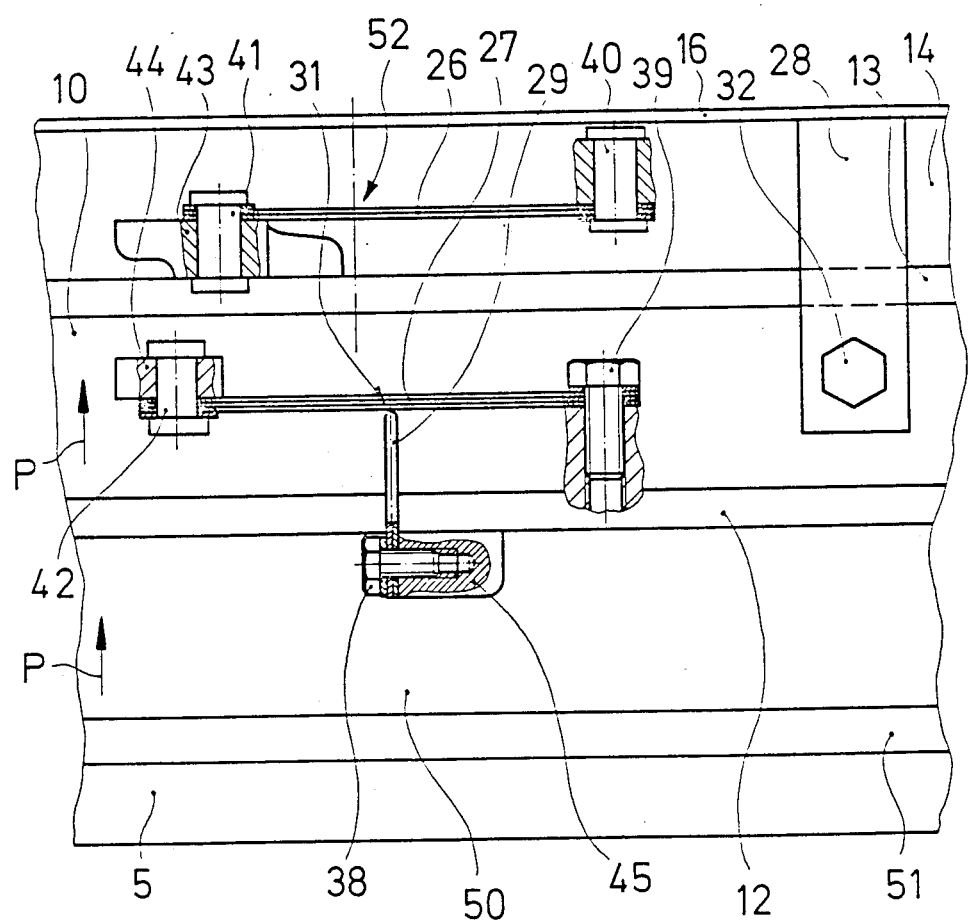

MULTI-DISC CLUTCH UNIT, PARTICULARLY FOR HEAVY-DUTY MOTOR VEHICLES

BACKGROUND OF THE INVENTION

In heavy-duty motor vehicles, particularly in heavy-duty trucks, multi-disc clutch units are used for connecting and disconnecting the output shaft of an engine and the input shaft of a gear box. These multi-disc clutch units comprise between the fly-wheel of the engine and a clutch cover fixed thereto a pressure plate and at least one intermediate plate. On both sides of said intermediate plate there is provided one clutch disc. A main spring urges the pressure plate towards the fly-wheel such that the clutch discs are in frictional engagement with the pressure plate, the intermediate plate and the fly-wheel. On disengagement of the clutch a lifting movement of the pressure plate and the intermediate plate away from the fly-wheel is wanted in order to liberate the clutch discs from frictional engagement with the adjacent members. For effecting the lifting movement of the intermediate plate a release spring is provided. The lifting movement of the intermediate plate is controlled such that the lifting movement of the intermediate plate is smaller than the lifting movement of the pressure plate. The control of the lifting movement is obtained by supporting the intermediate plate on a counter support member movable in response to the disengagement action.

STATEMENT OF THE PRIOR ART

From German 'Offenlegungsschrift' 30 41 342 a clutch unit is known in which the lifting movement of the intermediate plate is controlled by a lever member which is on the one hand supported by the clutch cover or clutch housing and on the other hand on the pressure plate. In this construction, it is guaranteed that the intermediate plate follows the lifting movement and the clutch engagement movement of the pressure plate. The intermediate plate travels through a path of movement corresponding to one half of the path of movement of the pressure plate. This control of the intermediate plate allows a balanced torque transmission action of both clutch discs so that the friction linings of both clutch discs are evenly worn. In the known construction, additional construction members are necessary for controlling the lifting movement of the intermediate plate.

OBJECT OF THE INVENTION

It is the object of the present invention to improve a clutch unit of the above discussed type such that it is simpler in assembly and thus possesses greater operational reliability and can be produced more economically, while the full function is maintained.

SUMMARY OF THE INVENTION

In view of the above object of the invention a multi-disc clutch unit, particularly for heavy-duty motor vehicles, comprises a clutch cover having an axis and being adapted for being mounted to a fly-wheel. A pressure plate is located on the axial side of the clutch cover which is directed towards the fly-wheel. The pressure plate is mounted for common rotation with the clutch cover and is axially movable with respect thereto. At least one intermediate plate is provided on the axial side of the pressure plate which is directed towards the fly-wheel. This intermediate plate is mounted for common rotation with the clutch cover and for axial movement with respect thereto. At least two clutch discs are located axially adjacent both axial sides of said at least one intermediate plate, respectively. Main spring means supported by the clutch cover act onto the pressure plate in a direction towards the fly-wheel such as to urge the clutch discs—when the clutch unit is assembled with the fly-wheel—into frictional engagement with the pressure plate, said at least one intermediate plate and the fly-wheel, respectively. Clutch disengagement means act against the main spring means in order to release the clutch discs from the frictional engagement. The pressure plate is liftable towards the clutch cover from a clutch engagement position to a clutch disengagement position in response to a clutch disengagement action of the clutch disengagement means. The intermediate plate is liftable by release spring means towards the clutch cover from a clutch engagement position to a clutch disengagement position in response to a clutch disengagement action of the clutch disengagement means. The axial lifting movement of the intermediate plate between the clutch engagement position and the clutch disengagement position thereof is controlled by intermediate plate support means supporting the intermediate plate against the action of the release spring means on counter support means which are axially movable in response to the action of the clutch disengagement means. Thus the axial lifting movement of the intermediate plate between the clutch engagement position and the clutch disengagement position thereof is smaller than the axial movement of the pressure plate between the clutch engagement position and the clutch disengagement position thereof. The counter support means fulfill besides their counter-supporting function an additional function within the clutch unit.

Thus the use of additional counter support means is avoided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will next be explained in greater detail by reference to several examples of embodiment. Individually:

FIG. 9 shows the partial elevation from radially outside of a three-disc clutch using distance pieces of different construction style.

DETAILED DESCRIPTION OF THE DRAWINGS

Figure 1:
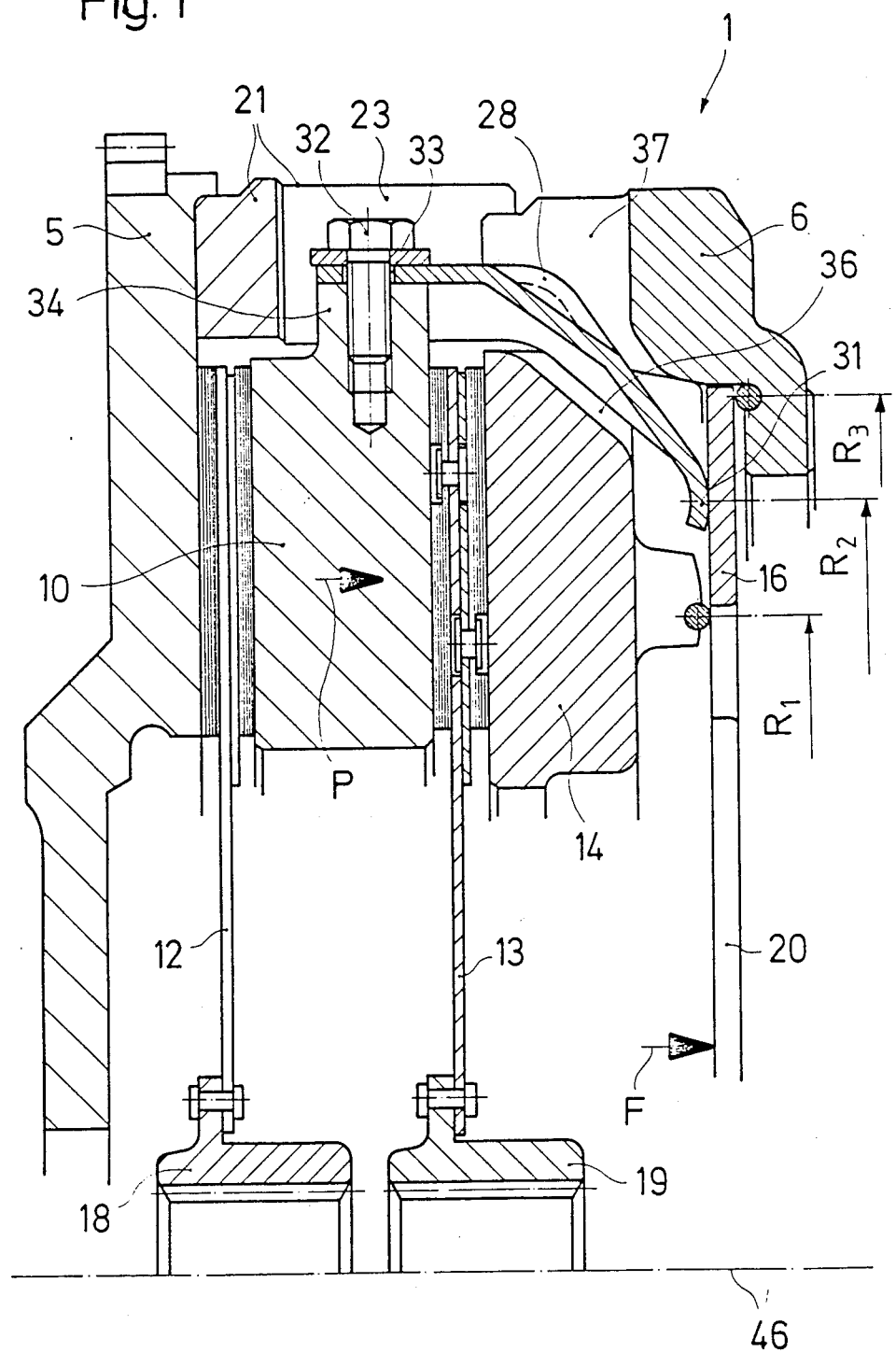
FIG. 1 shows the partial longitudinal section through a clutch unit with diaphragm spring of pulled-type construction.

FIG. 1 shows the partial longitudinal section through a clutch unit 1 of a two-disc clutch which is secured to a fly-wheel 5 of an internal combustion engine (not shown). The clutch unit 1 consists inter alia of a clutch cover 6 which is screwed, with interposition of an intermediate ring 21, to the fly-wheel 5 and held distant therefrom in the axial direction. The parts 1, 5 and 21 are arranged concentrically with the rotation axis 46. Between the cover 6 and the fly-wheel 5, starting from the cover 6, the following components are arranged; pressure plate 14, clutch disc 13, intermediate plate 10 and clutch disc 12. Between the clutch cover 6 and the pressure plate 14 a diaphragm spring 16 is arranged which is supported in the region of its external circumference on the clutch cover 6 and in a radially intermediate zone on the pressure plate 14. The entire clutch can be engaged and disengaged through radially inwardly pointing spring tongues 20 of the diaphragm spring 16. For disengaging a clutch disengagement system (not illustrated further) is provided which can exert a release force in the direction of the arrow F upon the spring tongues 20.

Figure 3:
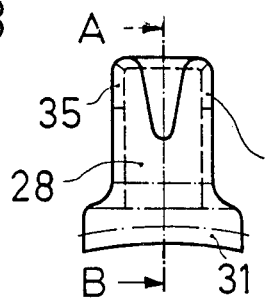
FIGS. 3 and 4 show an elevation and longitudinal section through a distance piece according to FIGS. 1 and 2.
Figure 4:
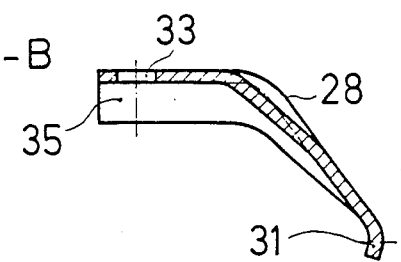

The two clutch discs 12 and 13 are arranged with their hubs 18 and 19 fast in rotation but axially displaceably on a gear input shaft (not shown). Both the pressure plate 14 and the intermediate plate 10 are mounted fast in rotation in the circumferential direction in relation to the clutch cover 6, but arranged displaceably in the axial direction. This securing can take place either through tangential leaf springs or through longitudinal guides between pressure plate 14 and intermediate plate 10 for the one part and clutch cover 6 and intermediate ring 21 for the other. In every case at least the intermediate plate 10 must be loaded in the direction of the arrow P by a release spring means R in order to guarantee the satisfactory release function. In the case of suspension of the intermediate plate 10 through tangential leaf springs this force is applied by the latter. In the case of longitudinal guidance through dogs separate release spring means would have to be provided. The release movement of the pressure plate 14 can likewise take place through tangential leaf springs, but it can also be guaranteed by a positive connection between the diaphragm spring 16 and the pressure plate 14. On the intermediate plate 10 there are provided several radially protruding dogs 34 distributed on the circumference, to each of which a distance piece 28 is screwed. Each of these distance pieces 28 extends in the direction towards the diaphragm spring 16 and there abuts with its free end 31 on the side of the diaphragm spring 16 facing the intermediate plate 10 and the fly-wheel 5. This abutment takes place on a radius $R_2$ which is provided approximately in the middle between the two engagement radii $R_3$ and $R_1$ of the diaphragm spring 16 firstly on the clutch cover 6 and next on the pressure plate 14. Each of these distance pieces 28, as may also be seen from FIGS. 3 and 4, is made as a sheet metal part and stiffened by a U-shaped formation. The distance pieces 28 have U-form in cross-section and form laterally drawn-down legs 35. These legs 35 can be guided in the axial direction on corresponding guide faces of the dogs 34, for easier assembly. Thus orientation of the distance pieces 28 with regard to their course in the axial direction is facilitated.

Each distance piece 28 is connected through a radially extending screw 32 with the dog 34. For the adjustment of the distance pieces 28 these are equipped with a slot 33 which is made larger in the axial direction than the diameter of the screw 32. Thus when the clutch unit 1 is in the assembled condition an adjustment of each distance piece 28 can be effected once, which piece must then lie with its free end 31 on the diaphragm spring 16. For the accommodation of the distance pieces 28 corresponding recesses 23, 36 and 37 are provided both in the intermediate ring 21, in the clutch cover 6 and also in the pressure plate 14.

The function of the clutch unit according to FIG. 1 is as follows: The illustration reproduces the engaged position of the clutch. In this position the distance pieces 28 are adjusted once in assembly so that with their free ends they rest on the diaphragm spring 16. Due to the pre-stress of the diaphragm spring 16 the torque to be transmitted is transmitted from the fly-wheel 5 and from the pressure plate 14 uniformly to the two clutch discs 12 and 13. For clutch disengagement the spring tongues 20 are loaded with a release force in the direction of the arrow F so that the diaphragm spring 16 pivots about the tilting circle $R_3$. The pressure plate 14 follows this movement of the diaphragm spring directed away from the fly-wheel 5, with a specific path of axial lifting movement. Parallel with this lifting movement of the pressure plate 14 at the same time the intermediate plate 10 is disengaged by about half the above-mentioned path of axial lifting movement, since for the one part it is pre-loaded by release spring means in the direction of the arrow P and for the other part it is supported through the distance pieces 18 on a point of the diaphragm spring 16 which travels about half of the path of axial lifting movement of the pressure plate 14 in the same direction. In this simultaneous release of the two clutch discs 12 and 13, simultaneous liberation of both clutch discs takes place, whereby the clutch disc 13 between intermediate plate 10 and pressure plate 14 together with its hub 19 is released in the toothing of the gear shaft, namely by the amount of the release movement of the intermediate plate 10, without a torque loading in the direction of the arrow F.

This displacement proceeds very easily since the clutch disc 13, due to the release movement of the pressure plate 14, has to transmit no more torque from the fly-wheel 5 to the gear shaft. In a subsequent engagement movement of the clutch disengagement means due to the diminution of the release force on the spring tongues 20, in which these move contrarily of the arrow F, an engagement movement of the pressure plate 14 takes place in the direction towards the fly-wheel 5 and at the same time an engagement movement of the intermediate plate 10, likewise in the direction towards the fly-wheel 5. In this movement the intermediate plate 10 travels about half the path of axial engagement movement of the pressure plate 14. In this engagement movement both clutch discs 12 and 13 are positively engaged simultaneously without one of the two being previously loaded by a torque which was not present in the other. In this way uniform wearing of the friction linings of both clutch discs takes place, and the distance pieces 18 firmly connected with the intermediate plate 10 additionally positively effect a uniform wear. This effect comes form the fact that the clutch disc having the possibly more worn friction lining is loaded later with torque and also experiences a lower torque loading. Thus the clutch disc with the less worn friction lining is more heavily loaded and thus also wears more quickly.

The use of the diaphragm spring 16, which can equally well be made as a cup spring, for the positive engagement and release movements of the intermediate plate 10 results in an especially economical and functionally reliable clutch unit, since in contrast to the prior art here the diaphragm spring takes over both the function of clamping in the two clutch discs 12 and 13 and also the function of controlling the intermediate plate 10 in engagement and disengagement. In this case the force of the release spring means on the intermediate plate 10 in the direction of the arrow P must be so great that in all operational conditions, that is in the released condition, the distance pieces 28 bear with their free ends 31 reliably on the diaphragm spring 16.

Figure 2:
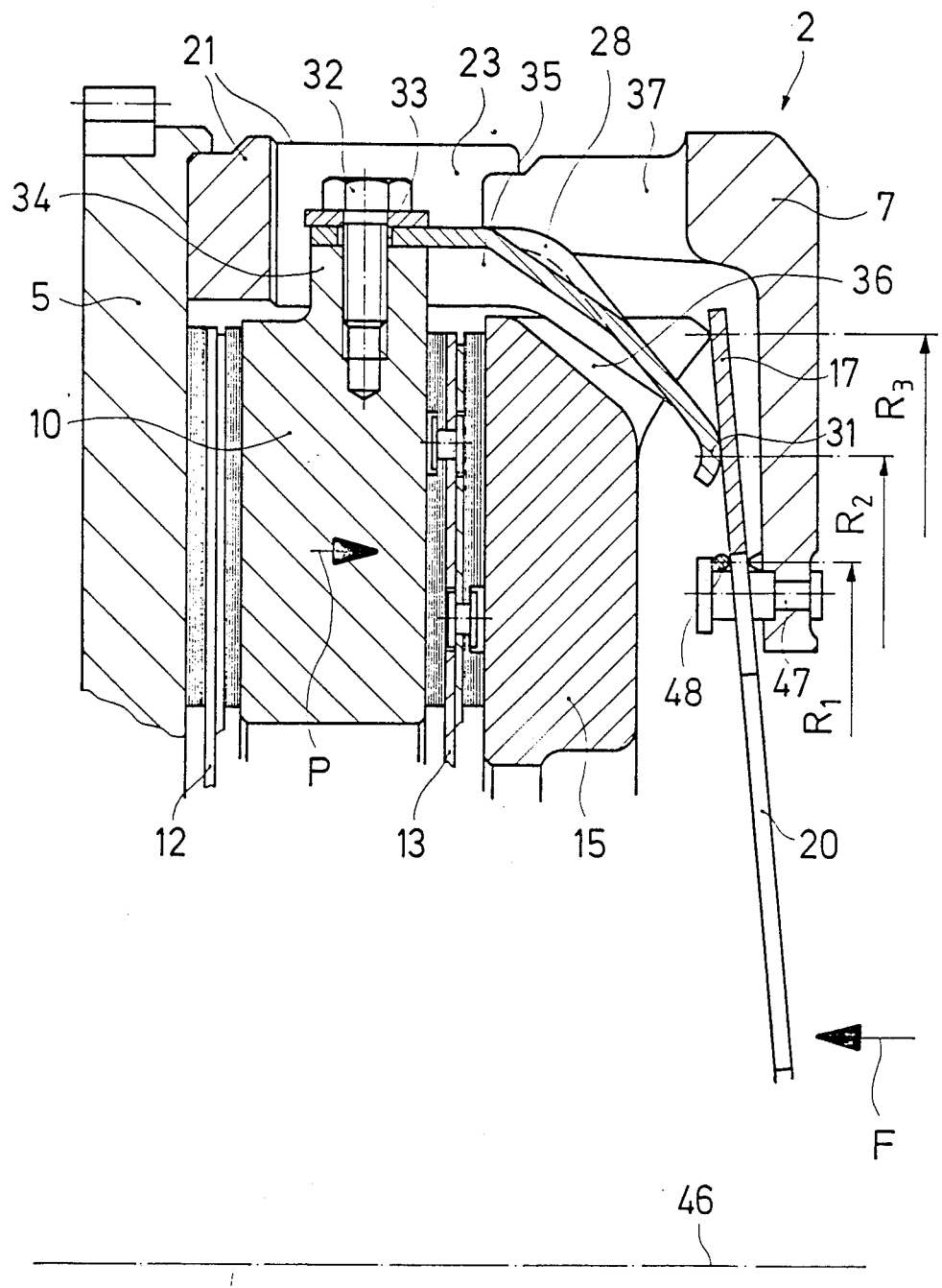
FIG. 2 shows the partial longitudinal section through a clutch unit with diaphragm spring of pressed-type construction.

In FIG. 2 there is reproduced a partial longitudinal section through a clutch unit 2 which differs from the clutch unit 1 according to FIG. 1 only in that here what is called a pressed-type clutch construction is present. In the case of a pressed-type clutch the arrangement of the diaphragm spring 17 is made such that it bears in the region of its external circumference on the pressure plate 15 and in the region of a smaller diameter on the clutch cover 7. For this purpose in the cover 7 there are arranged several rivet bolts 47 distributed on the circumference which penetrate the diaphragm spring 17 in the interspaces between the individual diaphragm spring tongues 20 and form on the back, by way of a support ring 48, a tilting circle of radius $R_1$. Between this tilting circle and the tilting circle with radius $R_3$, opposite to the pressure plate 15, the abutment region for the free ends 31 of the distance pieces 28 lies in the middle on a radius $R_2$. The other components of this clutch unit 2 are identical with those of the clutch unit 1 according to FIG. 1. In function likewise no differences occur since in the present case again the distance pieces 28 in combination with a release spring force in the direction of the arrow P guarantee a lasting and exact abutment of the free ends 31 on a point of the diaphragm spring 17 which guarantees half the release and engagement distances of the intermediate plate 10. The advantages of this clutch correspond to those of FIG. 1. A more detailed description of the manner of operation is superfluous, since pressed-type diaphragm spring clutches are generally known.

FIGS. 3 and 4 show an elevation and section A-B of a distance piece 28, the function of these parts already having been described in detail in connection with the function of FIGS. 1 and 2.

Figure 6:
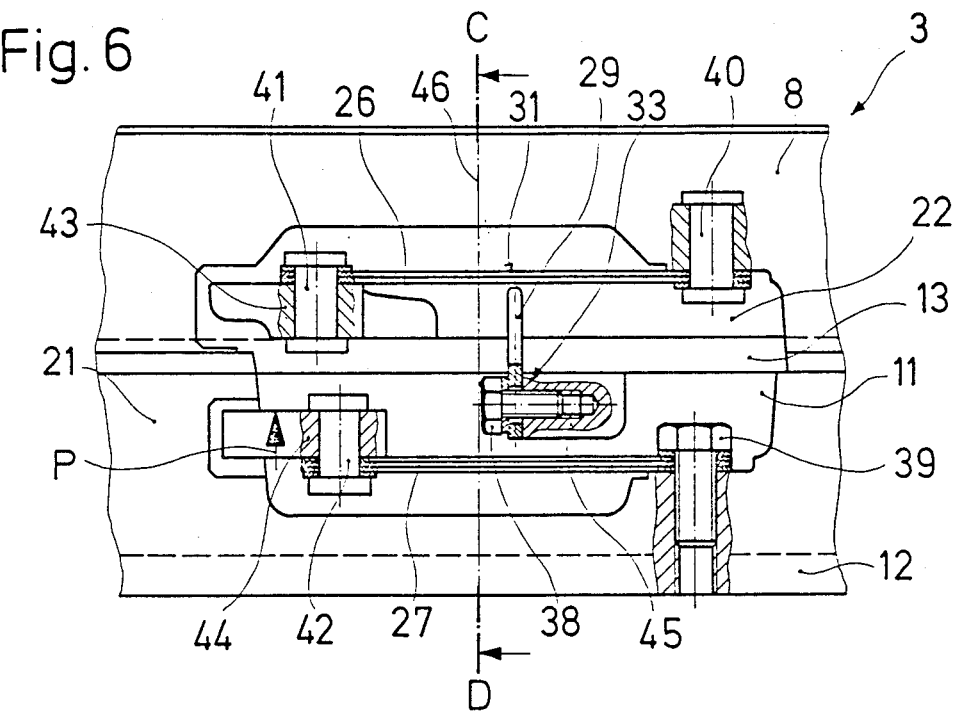
FIGS. 5, 6 and 7 show a longitudinal section and two part elevations from radially outside of a clutch unit using tangential leaf springs as travel-path controlling component for the intermediate plate.
Figure 7:
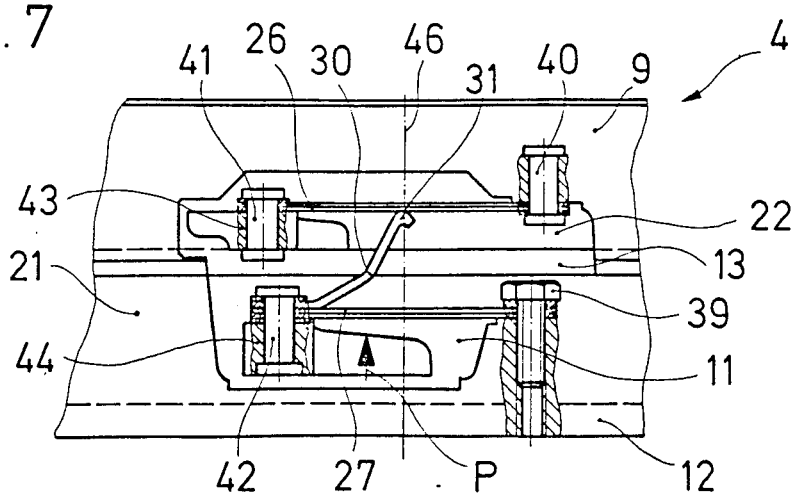
Figure 5:
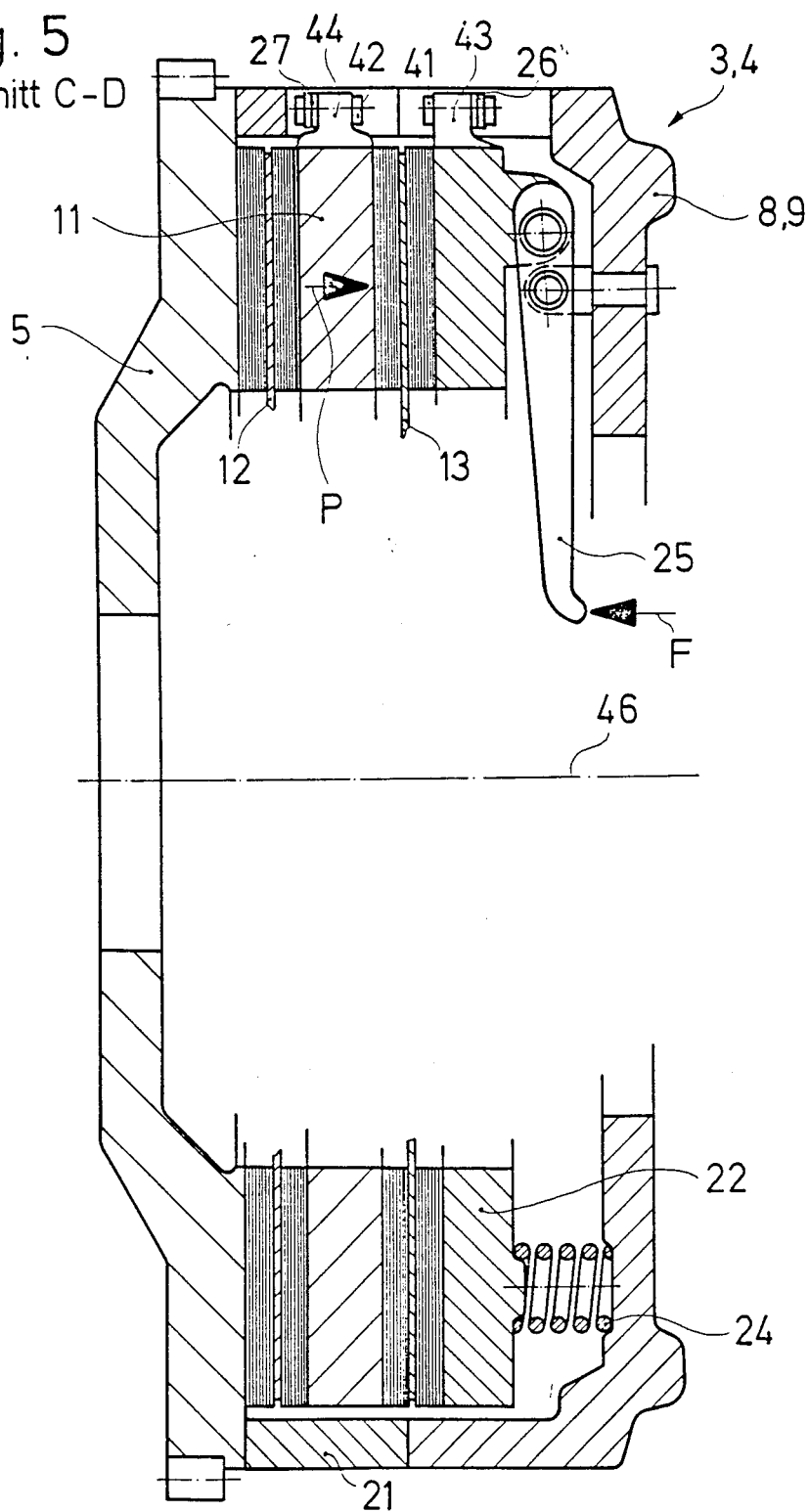

The description of FIGS. 5 to 7 now follows: FIG. 5 shows the longitudinal section C-D through a clutch unit 3 and 4 respectively according to FIGS. 6 or 7, where the pressure application force of the pressure plate 22 takes place through helical springs 24.

For the actuation of the clutch several release levers 25 distributed on the circumference are provided which are mounted pivotably both in the clutch cover 8, 9 and in the pressure plate 22. In a clutch of this style of construction the diaphragm or cup spring for controlling the intermediate plate 11 is not necessary. In the present case therefore, as may be seen especially from the partial views according to FIGS. 6 and 7, the tangential leaf springs 26 between pressure plate 22 and clutch cover 8 and 9 are used. In this case distance pieces 29 and 30, respectively, are arranged fixedly on the intermediate plate 11 and rest with their free ends on the tangential leaf springs 26, namely at a point which is equidistant from the securing of the tangential leaf springs 26 on the pressure plate 22 and on the cover 8 and 9, respectively. For this purpose radially outwardly protruding dogs 43 are provided on the pressure plate 22, to which the tangential leaf springs 26 are secured through securing rivets 41. With their other ends the tangential leaf springs 26 are arranged each on the clutch cover 8, 9. According to FIG. 6 a distance piece 29 screwed to a dog 45 of the intermediate plate 11 is supported in the middle of the tangential leaf springs 26. On this dog 45 there extends a securing surface passing through the axis 46 of rotation of the clutch. A screw 38 here extends through a slot 33 of the distance piece 29. This slot 33 is necessary for the first adjustment of the distance piece 29. Here again the intermediate plate 11 must be loaded with a release force in the direction of the arrow P which is supplied by tangential leaf springs 27 when these are present for the rotation fast connection of the intermediate plate 11 with the intermediate ring 21. In the absence of tangential leaf springs this spring force can be generated by other release spring means. In the present case the intermediate plate 11 possesses radially outwardly pointing dogs 44 for the securing of the tangential leaf springs 27 by means of securing rivets 42. The other ends of the tangential leaf springs 27 are connected through screws 39 with the intermediate ring 21.

The function of the clutch according to FIGS. 5 and 6 can easily be deduced from the statements hitherto. In the release of the pressure plate 22 by means of the levers 25 being moved in the direction of the arrow F, the securing region on the pressure plate side of the tangential leaf springs 26 is moved by its release path in the direction towards the cover 8. The other end of the tangential leaf springs 26 remains axially fixed. Thus the middle region of the tangential leaf springs 26 moves by half of the release path of the pressure plate 22 likewise in the release direction. In this intermediate region the intermediate plate 11 with the distance piece 29 rests on the tangential leaf springs 26. Therefore the intermediate plate 11 carries out half the release movement of the pressure plate 22 at the same time and in the same direction. The same advantageous effects occur as already described in connection with FIGS. 1 and 2.

While in an embodiment according to FIGS. 5 and 6 the presence of the tangential leaf springs 27 is not absolutely necessary, in the case of an embodiment according to FIG. 7 the necessity exists of securing the intermediate plate 11 with tangential leaf springs 27 on the clutch cover and on the intermediate ring. The securing region on the intermediate plate side for the tangential leaf springs 27 in the form of the dogs 44 is in fact used at the same time for the securing of the abutment lever 30. The securing rivets 42 for securing the tangential leaf springs 27 to dogs 44 serve at the same time for securing the abutment lever 30. The basis is here adopted of the generally usual arrangement where the tangential leaf springs 26 for the pressure plate 22 and the tangential leaf springs 27 are arranged staggered in the axial direction one behind the other. Thus the abutment layer 30 must have an oblique course and be somewhat cranked so that it comes to abut with its free end 31 approximately on the circumferential centre of the tangential leaf springs 26. Otherwise this embodiment does not differ from the embodiment according to FIGS. 5 and 6. For the adjustment of the abutment levers 30 they can be adapted to the conditions of installation in each case for example by bending. More detailed description of the function is superfluous.

The controlling of the disengagement and engagement movements of the intermediate plate of a two-disc clutch as described above can be carried out not only with tangential leaf springs; it is in principle also possible to use radial leaf springs for this purpose. In both cases the advantage is to be seen in that components which are already essential components of a clutch are used additionally for controlling the movement of the intermediate plate. Furthermore it is not compulsory to use helical springs for the actuation of the pressure plate in the embodiments according to FIGS. 5 to 7. In principle it is also possible to provide cup springs or diaphragm springs at this point. On the other hand embodiments according to FIGS. 1 and 2 are possible only with cup springs or diaphragm springs, completely independently of whether tangential leaf springs are used for the suspension of intermediate plate and pressure plate.

Figure 8:
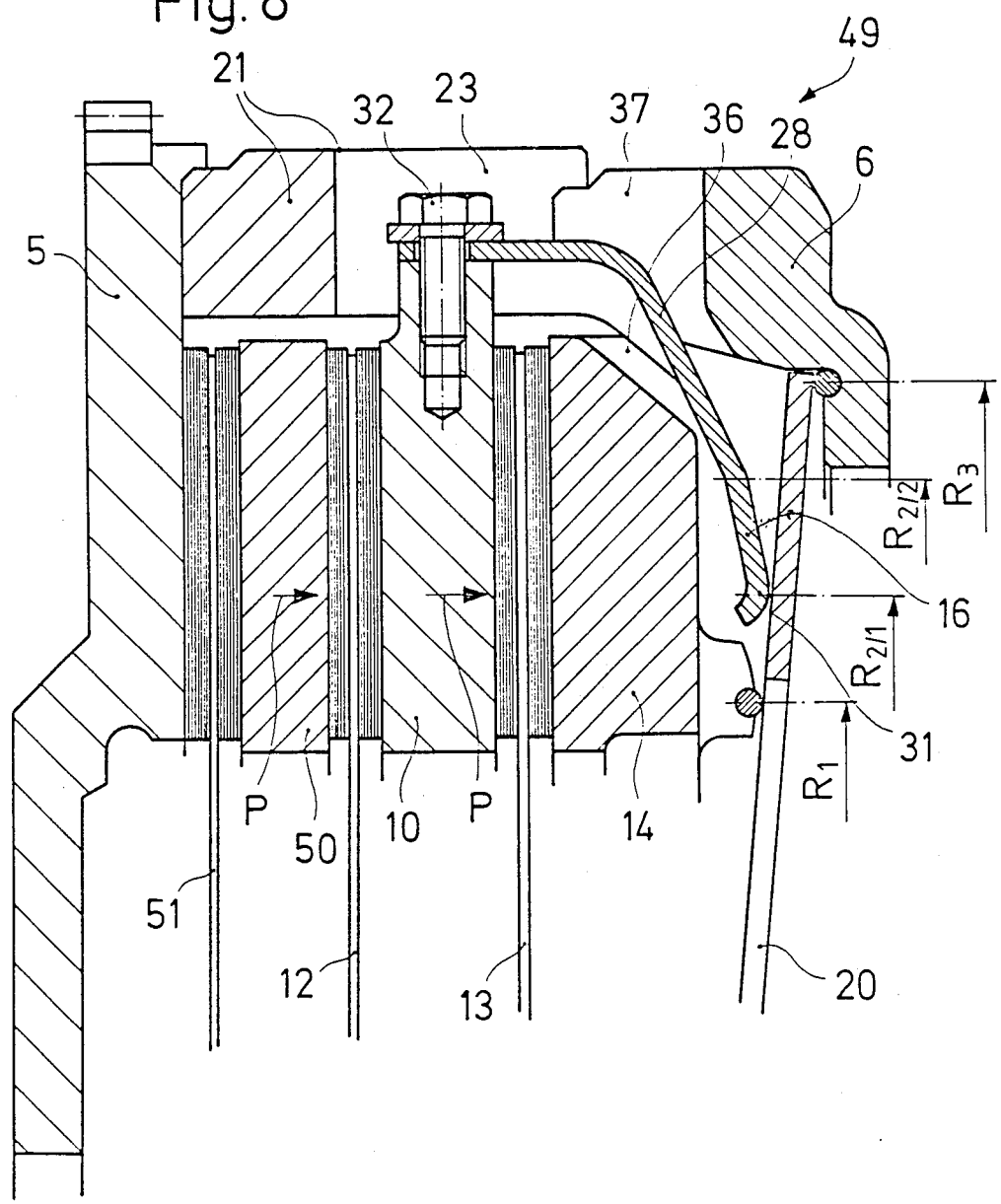
FIG. 8 shows a partial longitudinal section through a three-disc clutch using distance pieces.

In FIG. 8 there is reproduced a partial longitudinal section of a three-disc clutch. This basis is here essentially adopted of the embodiment according to FIG. 1 and as far as possible the same reference numerals are used. The clutch unit 49 present here consists of a known clutch cover 6 with corresponding intermediate ring 21, both being secured to a fly-wheel 5. In the clutch cover 6 a diaphragm spring 16 is supported in the region of its external circumference according to $R_3$. This spring is further supported on a smaller circumference on the pressure plate 14 according to $R_1$. The pressure plate 14 is followed by a clutch disc 13, an intermediate plate 10, a further clutch disc 12, a further intermediate plate 50 and a third clutch disc 51. The intermediate plate 10 is controlled in its release movement through distance pieces 28, in principle as in FIG. 1, in that the free ends 31 rest on the inner side of the diaphragm spring 16, namely due to the force of release spring means according to the arrow P. The distance pieces 28 are displaceable in the usual way and are adjusted once. The free ends 31 are here however in abutment not in a middle region between $R_1$ and $R_3$ but on a radius $R_{2/1}$ which is greater than $R_1$ by one-third of the difference between $R_3$ and $R_1$.

Thus it is guaranteed that the intermediate plate 10 carries out two-thirds of the release movement of the pressure plate 14. In order now to move the intermediate plate 50 with about one-third of the release movement of the pressure plate 14, distance pieces are likewise provided on the latter, which however do not lie in the plane of the drawing and therefore are not illustrated. They extend in principle like the distance pieces 28 of the intermediate plate 10 in recesses 23, 37 and 36 of the intermediate ring 21, of the housing 6 and of the pressure plate 14, but they are made longer than the distance piece 28 and they also abut on a different radius, namely on the radius $R_{2/2}$. This radius is larger than $R_1$ by about two-thirds of the difference between $R_3$ and $R_1$, so that at this point and for the intermediate plate 50 about one-third of the release movement of the pressure plate 14 results. Thus it is ensured that in this present three-disc clutch again the two intermediate plates 50 and 10 are uniformly disengaged and engaged, each with the proportion of the release movement due to it. At this point it should also be mentioned that a similar embodiment of pressed-type constructon style is likewise possible, but then the abutment points of the distance pieces are exchanged compared with FIG. 8, for the two intermediate plates. This results quite simply from the different course of movement of the diaphragm spring in a pressed system.

However a further possibility exists for releasing an intermediate plate 50 according to FIG. 8 positively with one-third of the release movement of the pressure plate 14. Such a possibility is represented in FIG. 9 which shows a simplified partial elevation of a three-disc clutch from radially outside. The essential components are here identical and also identically numbered with those of FIG. 8. Thus by way of example the intermediate plate 10 is controlled through the distance pieces 28 which rest on the diaphragm spring 16 in accordance with FIG. 8. In the present case the pressure plate 14 is fixed for example through tangential leaf springs 26, but another suspension is also possible.

On the other hand the circumferential attachment of the intermediate plate 10 is possible only through tangential leaf springs 27 in known manner, since the release operation of the intermediate plate 50 takes place through these tangential leaf springs 27. The intermediate plate 50 is here provided with a plurality of distance pieces 29 distributed on the circumference and point in the axial direction, as already proposed according to FIG. 6. Here again these distance pieces 29 bear with their free ends 31 on the middle region of the circumferential extent of the tangential leaf springs 27 due to the force of any release spring means which is effective in the direction of the arrow B. Thus the intermediate plate 50 automatically accompanies the intermediate plate 50 over half its release movement, whereby one-third of the total release movement also results for the intermediate plate 50. Here again it is possible to provide either the pressed-type or the pulled-type principle on the clutch unit, it must merely be taken into account that the distance pieces 28 rest on the corresponding point of the diaphragm spring 16, either at $R_{2/1}$ or at $R_{2/2}$, as already explained in detail in connection with FIG. 8.

It remains only to state that in a three-disc clutch according to FIG. 9, where the pressure plate 14 is loaded by helical springs, the distance pieces 28 cannot come into use. In such a case it is readily possible to control the intermediate plate 10 through distance pieces similar to the distance pieces 29 from the tangential leaf springs 26. In this case admittedly these distance pieces must be arranged in accordance with the arrow 52 at a distance of the circumferential extent of the tangential leaf springs 26 of two-thirds of the length, starting from the securing rivets 40. In this way the intermediate plate 10 can travel two-thirds of the release movement of the pressure plate 14, while the intermediate plate 50 as before carries out one-third of the release movement of the pressure plate 14.

While specific embodiments of the invention have been shown and described in detail to illustrate the application of the invention principles, it will be understood that the invention may be embodied otherwise without departing from such principles.

The reference numerals in the claims are only used for facilitating the understanding and are by no means restrictive.

What is claimed is:

1. A multi-disc clutch unit, particularly for heavy-duty motor vehicles, comprising:
   a clutch cover (6) having an axis (46) and being adapted for being mounted to a flywheel (5);
   a pressure plate (14) located on the axial side of said clutch cover (6) which is directed towards said flywheel (5), said pressure plate (14) being mounted for common rotation with said clutch cover (6) and being axially movable with respect thereto;

at least one intermediate plate (10) on the axial side of said pressure plate (14) which is directed towards said flywheel (5), said intermediate plate (10) being mounted for common rotation with said clutch cover (6) and for axial movement with respect thereto;

at least two clutch discs (13, 12) located axially adjacent both axial sides of said at least one intermediate plate (10), respectively, said at least two clutch discs (13, 12) being mounted for common rotation on a common shaft and being axially movable with respect to said common shaft;

main spring means (16) consisting of a single one of a cup spring and a diaphragm spring supported by said clutch cover (6) and acting through said pressure plate (14) onto said at least two clutch discs (13, 12) such as to urge said clutch discs (13, 12)—when the clutch unit is assembled with said flywheel (5)—into frictional engagement with said pressure plate (14), said at least one intermediate plate (10), and said flywheel (5), respectively;

clutch disengagement means (F) acting against said main spring means (16) in order to simultaneously release said clutch discs (13, 12) from said frictional engagement;

said pressure plate (14) being liftable towards said clutch cover (6) from a clutch engagement position to a clutch disengagement position in response to a clutch disengagement action of said clutch disengagement means (F);

said intermediate plate (10) being biased by release spring means towards said clutch cover (6) such as to be liftable by said release spring means from a clutch engagement position to a clutch disengagement position in response to a clutch disengagement action of said clutch disengagement means (F), the release spring means caused axial lifting movement of said intermediate plate (10) between the clutch engagement position and the clutch disengagement position thereof being limited by intermediate plate support means (28) fastened to said intermediate plate (10) and abutting said one of a cup spring and a diaphragm spring on a side thereof facing said flywheel, such that the axial lifting movement of said intermediate plate (10) between the clutch engagement position and the clutch disengagement position thereof is smaller than the axial movement of said pressure plate (14) between the clutch engagement position and the clutch disengagement position thereof.

2. A multi-disc clutch unit as set forth in claim 1, comprising two clutch discs (13, 12), said intermediate plate (10) being provided with at least two distance pieces (28) acting as said intermediate plate support means and being distributed about said axis (46), said distance pieces (28) engaging said one of a diaphragm spring (16) and cup spring at a radius of engagement (R) which is different from a radius of engagement ($R_1$) in which said one of a diaphragm spring (16) and cup spring engages said pressure plate (14).

3. A mutli-disc clutch unit as set forth in claim 2, said one of a diaphragm spring (16) and cup spring having a radius of engagement ($R_1$) with said pressure plate (14) and a radius of engagement ($R_3$) with said clutch cover (6), said distance pieces (28) engaging said one of a diaphragm spring (16) and cup spring at a location ($R_2$) approximately midways of a difference between said radii of engagement ($R_1$, $R_3$).

4. A multi-disc clutch unit as set forth in claim 2, wherein said distance pieces (28) are axially adjustable with respect to said intermediate plate (10).

5. A multi-disc clutch unit as set forth in claim 2, wherein said distance pieces (28) are mounted on an outer circumferential face of said intermediate plate (10) by radially extending screws (32), said radially extending screws (32) passing through axially extending slots (33) of said distance pieces (28).

6. A multi-disc clutch unit as set forth in claim 2, said distance pieces (28) having a U-shaped cross-section when regarded in a section perpendicular to said axis (46) at a location of interconnection between said intermediate plate (10) and the respective distance piece (28), said intermediate plate (10) being provided at said location of interconnection with a radially protruding dog (34), said radially protruding dog (34) being received within said U-shaped cross-section such as to secure the respective distance piece (28) substantially in a respective plane containing said axis (46).

7. A multi-disc clutch unit as set forth in claim 2, said distance pieces (28) being received by recesses (36, 37, 23) in at least one of said pressure plate (14), said clutch cover (6) and a possible intermediate ring (21) located between said clutch cover (6) and said fly-wheel (5).

8. A multi-disc clutch unit as set forth in claim 1, wherein said release spring means comprise a plurality of leaf springs (27) interconnecting said intermediate plate (11) for common rotation with said clutch cover (8, 9).

9. A multi-disc clutch unit as set forth in claim 8, wherein said leaf springs (27) are tangential leaf springs.

10. A multi-disc clutch unit as set forth in claim 1, comprising three clutch discs (13, 12, 51) and two intermediate plates (10, 50), namely a first intermediate plate (10) adjacent said pressure plate (14) and a second intermediate plate (50) remote from said pressure plate (14), the axial lifting movement of said second intermediate plate (50) being smaller than the axial lifting movement of said first intermediate plate (10) both said first (10) and said second (50) intermediate plates being provided with distance pieces (28), the distance pieces (28) of said first intermediate plate (10) engaging said one of a diaphragm spring (16) and a cup spring in a radial location ($R_{2/1}$) different from the radial location ($R_{2/2}$) in which the distance pieces of said second intermediate plate (50) engage said one of a diaphragm spring (16) and a cup spring.

11. A multi-disc clutch unit as set forth in claim 10, said one of a diaphragm spring (16) and a cup spring having a radius of engagement ($R_1$) with said pressure plate (14) and a radius of engagement ($R_3$) with said clutch cover (6), said distance pieces (28) of said first intermediate plate (10) engaging said one of a diaphragm spring (16) and cup spring at a location of engagement ($R_{2/1}$) approximately distanced by one third of the radial difference of said radii of engagement from one of said radii of engagement, the distance pieces of said second intermediate plate (50) engaging said one of a diaphragm spring (16) and cup spring at a location of engagement ($R_{2/2}$) approximately distanced by two thirds of the radial difference between said radii of engagement from said one of said radii of engagement.

12. A multi-disc clutch unit as set forth in claim 1, wherein the pressure plate (22) is connected for common rotation with said clutch cover (8) by a plurality of leaf springs (16) or the like, said counter support means being established by said leaf springs (26).

13. A multi-disc clutch unit as set forth in claim 12, said leaf springs (26) being tangential leaf springs with respect to said axis (46).

14. A multi-disc clutch unit as set forth in claim 12, wherein said intermediate plate (11) is provided with at least two distance pieces (29) acting as said intermediate plate support means and engaging said leaf springs (26) acting as said counter support means at respective locations intermediate the ends of said leaf springs (26).

15. A multi-disc clutch unit as set forth in claim 14, wherein said intermediate plate (11) is connected for common rotation with said clutch cover (9) by further leaf springs (27), said distance pieces (30) being connected to said intermediate plate (11) by connection means (42) connecting also said further leaf springs (27) to said intermediate plate (11).

16. A multi-disc clutch unit as set forth in claim 15, said further leaf springs (27) and said leaf springs (26) being substantially aligned in a direction parallel to said axis (46), and said distance pieces (30) being inclined with respect to said axis (46).

17. A multi-disc clutch unit as set forth in claim 1, comprising three clutch discs (13, 12, 51) and two intermediate plates (10, 50), namely a first intermediate plate (10) adjacent said pressure plate (14) and a second intermediate plate (50) remote from said pressure plate (14), the axial lifting movement of said second intermediate plate (50) being smaller than the axial lifting movement of said first intermediate plate (10), said first intermediate plate (10) being connected for common rotation with said clutch cover (6) by leaf springs (27), said first intermediate plate (10) being provided with at least two distance pieces (28) distributed about said axis (46) and engaging said counter support means (16), said second intermediate plate (50) being provided with at least two further distance pieces (29) distributed about said axis (46) and engaging said leaf springs (27) connecting said first intermediate plate (10) for common rotation with said clutch cover (6) at locations approximately midways of the ends (42, 39) of respective leaf springs (27).

18. A multi-disc clutch unit as set forth in claim 1, comprising three clutch discs (13, 12, 51) and two intermediate plates (10, 50), namely a first intermediate plate (10) adjacent said pressure plate (14) and a second intermediate plate (50) remote from said pressure plate (14), said pressure plate (14) being connected for common rotation with said clutch cover (6) by a group of leaf springs (26) and said first intermediate plate (10) being connected for common rotation with said clutch cover (6) by a further group of leaf springs (27), said second intermediate plate (50) being provided with a pluraltiy of distance pieces (29) engaging said leaf springs of said further group of leaf springs (27) at locations of engagement approximately midways of the ends (42, 39) thereof and said first intermediate plate (10) being provided with another plurality of distance pieces engaging said leaf springs of said group of leaf springs (26) at a location (52) approximately spaced from the end of said leaf springs of said group of leaf springs (26) fixed to said clutch cover (6) (at 40) by a distance corresponding to two thirds of the length between the ends (41, 40) of said leaf springs of said group of leaf springs (26).

19. A multi-disc clutch unit as set forth in claim 1, comprising two clutch discs (13, 12) and one intermediate plate (10), said axial lifting movement of said intermediate plate (10) being approximately one half of the axial lifting movement of said pressure plate (14).

20. A multi-disc clutch unit as set forth in claim 1, comprising three clutch discs (13, 12, 51) and two intermediate plates (10, 50), namely a first intermediate plate (10) adjacent said pressure plate (14) and a second intermediate plate (50) remote from said pressure plate (14), the axial lifting movement of said first intermediate plate (10) being approximately two thirds of the axial lifting movement of said pressure plate (14) and the axial lifting movement of said second intermediate plate (50) being approximately one third of the axial lifting movement of said pressure plate (14).

21. A multi-disc clutch unit as set forth in claim 1, said clutch being of the pulled-type, said one of a diaphragm spring (16) and cup spring having a radially outer zone axially supported by said clutch cover (6), a radially intermediate zone acting onto said pressure plate (14) and a radially inner zone engageable by said clutch disengagement means (F) in a direction away from said fly-wheel (5).

22. A multi-disc clutch unit as set forth in claim 1, said clutch being of the pressed-type, said one of a diaphragm spring (17) and cup spring having a radially outer zone engaging said pressure plate (15), a radially intermediate zone axially supported by said clutch cover (7) and a radially inner zone engageable by said clutch disengagement means (F) in a direction towards said fly-wheel (5).

23. A multi-disc clutch unit as set forth in claim 1, said main spring means comprising helical springs (24).

* * * * *